United States Patent
Van Dyck et al.

(10) Patent No.: US 10,764,518 B2
(45) Date of Patent: Sep. 1, 2020

(54) PIXEL STRUCTURE

(71) Applicant: XENOMATIX NV, Leuven (BE)

(72) Inventors: Dirk Van Dyck, Leuven (BE); Rik Paesen, Leuven (BE)

(73) Assignee: XENOMATIX NV, Leuven (BE)

( * ) Notice: Subject to any disclaimer, the term of this patent is extended or adjusted under 35 U.S.C. 154(b) by 0 days.

(21) Appl. No.: 16/605,626

(22) PCT Filed: Apr. 23, 2018

(86) PCT No.: PCT/EP2018/060391
§ 371 (c)(1),
(2) Date: Oct. 16, 2019

(87) PCT Pub. No.: WO2018/197441
PCT Pub. Date: Nov. 1, 2018

(65) Prior Publication Data
US 2020/0137330 A1    Apr. 30, 2020

(30) Foreign Application Priority Data

Apr. 23, 2017 (EP) .................... 17167660

(51) Int. Cl.
*H04N 5/355* (2011.01)
*G01S 17/18* (2020.01)
(Continued)

(52) U.S. Cl.
CPC ......... *H04N 5/3559* (2013.01); *G01S 7/4863* (2013.01); *G01S 17/18* (2020.01); *G01S 17/89* (2013.01)

(58) Field of Classification Search
CPC ......... G01S 17/08; H04N 9/04; H04N 5/2256
See application file for complete search history.

(56) References Cited

U.S. PATENT DOCUMENTS 5,576,827 A * 11/1996 Strickland .......... G01N 15/0211
356/336
9,551,791 B2 * 1/2017 Van Den Bossche ......................
G01S 7/481
(Continued)

FOREIGN PATENT DOCUMENTS

EP    2 322 953 A1    7/2009
EP    2 290 393 A2    3/2011
(Continued)

OTHER PUBLICATIONS

Anon, "Laser Range-Gated Imaging for Imaging at Long Ranges and Through Obscurants (Fog, Smoke, Mist, Haze, Rain)", Laser Range Gating—Long Range & Obscurants, Jun. 9, 2018 (5 pages).
(Continued)

*Primary Examiner* — Paulos M Natnael
(74) *Attorney, Agent, or Firm* — Polsinelli PC

(57) ABSTRACT

The present invention pertains to a pixel for use in a system for determining a distance to an object by range gating, said pixel comprising: a first charge storage well (221) and a second charge storage well (222) for accumulating electrical charges representative of amounts of light impinging on said pixel during respective sets of exposure intervals, wherein said first charge storage well (221) has a charge capacity that is at least 50% greater than a charge capacity of said second charge storage well (222). The invention also pertains to a range gating system comprising such a pixel.

16 Claims, 10 Drawing Sheets

(51) Int. Cl.
  *G01S 7/4863* (2020.01)
  *G01S 17/89* (2020.01)

(56) References Cited

U.S. PATENT DOCUMENTS

| | | | |
|---|---|---|---|
| 10,183,541 B2* | 1/2019 | Van Den Bossche | G01B 11/24 |
| 10,317,529 B2* | 6/2019 | Shu | G01S 17/42 |
| 10,520,590 B2* | 12/2019 | Jew | G01S 7/4865 |
| 10,585,176 B2* | 3/2020 | Boutaud | G01S 7/497 |
| 2004/0008394 A1 | 1/2004 | Lange et al. | |
| 2005/0145773 A1 | 7/2005 | Hashimoto et al. | |
| 2007/0158770 A1 | 7/2007 | Kawahito | |
| 2007/0177011 A1 | 8/2007 | Lewin et al. | |
| 2007/0177841 A1 | 8/2007 | Danziger | |
| 2010/0231891 A1* | 9/2010 | Mase | G01S 17/894 356/5.01 |
| 2012/0038903 A1 | 2/2012 | Weimer et al. | |
| 2012/0200841 A1 | 8/2012 | Kamiyama et al. | |
| 2013/0107032 A1* | 5/2013 | Yamada | B25J 11/00 348/86 |
| 2013/0148102 A1 | 6/2013 | Oggier | |
| 2014/0253758 A1 | 9/2014 | Metz | |
| 2015/0144790 A1 | 5/2015 | Velichko et al. | |
| 2015/0253429 A1 | 9/2015 | Dorrington et al. | |
| 2015/0260830 A1 | 9/2015 | Ghosh et al. | |
| 2015/0319347 A1 | 11/2015 | Cottrell | |
| 2015/0341573 A1 | 11/2015 | Matsuo et al. | |
| 2016/0266255 A1 | 9/2016 | Nishikawa et al. | |
| 2016/0295133 A1 | 10/2016 | Rudmann et al. | |
| 2018/0045513 A1 | 2/2018 | Kitamura et al. | |
| 2018/0053799 A1 | 2/2018 | Otani et al. | |
| 2018/0259647 A1 | 9/2018 | Takano et al. | |
| 2018/0299554 A1* | 10/2018 | Van Dyck | G01S 17/89 |
| 2019/0383917 A1* | 12/2019 | Shinozuka | G01S 17/08 |
| 2020/0025894 A1* | 1/2020 | Van Dyck | G01S 7/4863 |
| 2020/0033457 A1* | 1/2020 | Van Dyck | G01S 7/4815 |
| 2020/0033478 A1* | 1/2020 | Van Dyck | G01S 7/4815 |
| 2020/0034644 A1* | 1/2020 | Paesen | G01S 7/4865 |
| 2020/0124726 A1* | 4/2020 | Geuens | G01S 17/10 |

FOREIGN PATENT DOCUMENTS

| | | |
|---|---|---|
| EP | 2 290 402 A1 | 3/2011 |
| EP | 2 634 595 A1 | 2/2013 |
| EP | 3 045 935 A1 | 7/2016 |
| EP | 3 159 711 A1 | 4/2017 |
| WO | 2004/012269 A1 | 2/2004 |
| WO | 2014/122714 A1 | 8/2014 |
| WO | 2015/004213 A1 | 1/2015 |
| WO | 2015/162278 A1 | 10/2015 |
| WO | 2016/020073 A1 | 2/2016 |
| WO | 2016/076796 A1 | 5/2016 |

OTHER PUBLICATIONS

Büttgen et al., "Pseudonoise Optical Modulation for Real-Time 3-D Imaging with Minimum Interference", IEEE Transactions on Circuits and Systems—I: Regular Papers, vol. 54, No. 10, Oct. 2007 (pp. 2109-2119).

Huang et al., "Monolithic Integrated Piezoelectric MEMS-Tunable VCSEL", IEEE Journal of Selected Topics in Quantum Electronics, vol. 13, No. 2, Mar./Apr. 2007 (pp. 374-380).

Kawahito et al., "A CMOS Time-of-Flight Range Image Sensor With Gates-on-Field-Oxide Structure", IEEE Sensors Journal, vol. 7, No. 12, Dec. 2007 (pp. 1578-1586).

Stoppa et al., "An 80×60 Range Image Sensor Based on 10μm 50MHz Lock-In Pixels in 0.18μm CMOS", IEEE International Solid-State Circuits Conference, Session 22, Image Sensors, 22.7, 2010 (3 pages).

European Search Report dated Nov. 7, 2017, issued in European Application No. 17167660.4 (7 pages).

* cited by examiner

PIXEL STRUCTURE

CROSS-REFERENCE TO RELATED APPLICATIONS

This application is a National Phase filing under 35 U.S.C. § 371 of PCT/EP2018/060391 entitled A PIXEL STRUCTURE filed on Apr. 23, 2018, which claims priority to EP2017167660.4 entitled A PIXEL STRUCTURE filed Apr. 23, 2017, the entire contents of which is hereby incorporated by reference.

FIELD OF THE INVENTION

The present invention pertains to the field of pixels, in particular pixels for use in imaging systems for determining a distance to an object on the basis of time-of-flight information obtained by range gating.

BACKGROUND

U.S. Pat. No. 8,792,087 B2 to Andreas Spickerman et al. discloses a device in which at least two different transfer gates which couple a photoactive region to at least two different evaluating capacities are driven during different drive intervals so that charge carriers generated during the drive intervals by a radiation pulse reflected from the object of measurement and/or by ambient radiation can be transported from the photoactive region to the evaluating capacities each coupled to the at least two transfer gates. Another transfer gate is driven during a time outside the drive intervals of the at least two transfer gates to connect the photoactive region to a reference potential terminal acting as a charge carrier sink during the time outside the drive intervals of the at least two transfer gates.

It is a disadvantage of the system known from U.S. Pat. No. 8,702,087 B2 that the pixels get saturated by reflections from objects at short distances from the sensor.

United States patent application publication no. US 2007/158770 A1 to Shoji Kawahito, discloses a range-finding image sensor based upon measurement of reflection time of light with reduced fabrication processes compared to standard CMOS manufacturing procedures. An oxide film is formed on a silicon substrate, and two photo-gate electrodes for charge-transfer are provided on the oxide film. Floating diffusion layers are used to convert charges to electronic potential, a mechanism traditionally inherited from the legacy technology of Charged Coupled Devices (CCD). Extra transistors are provided for resetting and a diffusion layer to provide a given reset voltage.

It is a disadvantage of the pixel disclosed in US 2007/158770 A1 that it uses non-standard technology and that the pixel design does not allow the addition of additional wells without sacrificing active surface area of the pixel. This is suboptimal for usage in sensor systems with ultra low power lasers requiring large operational range. The used process is not commonly available in standard CMOS processes, which reduces this concept's applicability and its ability to be produced at an affordable cost in large volumes.

The range of a sensor based on such a design is also limited at the near end by saturation of the pixels by the strong reflections of projected light.

The saturation of pixels when sensing short-range reflections, or highly reflective objects such as traffic signs, license plates, etc., is especially problematic when the pixels are used in sensors for automotive applications, as is the purpose of the pixel according to the present invention, because Advanced Driver Assistance Systems (ADAS) and self-driving cars require high accuracy at short range. Moreover, in this application domain, accuracy at longer ranges, the ability to operate in bright ambient light conditions, and the requirement of compactness (requiring the use of solid-state semiconductor components) must not be sacrificed for the requirement of short-range accuracy.

It is therefore an object of embodiments of the present invention to overcome the short-range saturation problem for pixels used in range-gating based imaging systems by proposing a different pixel architecture.

Unpublished European patent application no. EP15191288.8, dated 23 Oct. 2015, in the name of the present applicant, describes a system for determining a distance to an object comprising: a solid-state light source arranged for projecting a pattern of spots of laser light towards the object in a sequence of pulses; a detector comprising a plurality of picture elements, the detector being configured for detecting light representing the pattern of spots as reflected by the object in synchronization with said sequence of pulses; and processing means configured to calculate the distance to the object as a function of exposure values generated by said picture elements in response to said detected light; wherein the picture elements are configured to generate said exposure values by accumulating, for each pulse of said sequence, a first amount of electrical charge representative of a first amount of light reflected by said object during a first predetermined time window and a second electrical charge representative of a second amount of light reflected by said object during a second predetermined time window, said second predetermined time window occurring after said first predetermined time window. Each of the plurality of picture elements may comprise at least two charge storage wells, and the detecting of the first amount of light and said detecting of said second amount of light occurs at respective ones of said at least two charge storage wells. EP15191288.8 does not describe a solution to the short-range saturation problem.

In a similar system, unpublished European patent application no. EP16192105.1, dated 3 Oct. 2016, in the name of the present applicant, describes that for given total pixel space, the saturation problem can be mitigated by using an asymmetric well arrangement, in which the photon capacity represented by the first well is increased, and the photon capacity represented by the second well is decreased. If the increase and decrease are balanced, an increase of the dynamic range can be obtained at no additional pixel surface cost, thus maintaining the same resolution. EP16192105.1 does not describe any specific ratios between the photon capacity represented by the first well and the photon capacity represented by the second well.

SUMMARY OF THE INVENTION

According to an aspect of the present invention, there is provided a pixel for use in a system for determining a distance to an object by range gating, said pixel comprising a first charge storage well and a second charge storage well for accumulating electrical charges representative of amounts of light reflected by said object and impinging on said pixel during respective sets of exposure intervals, and a third charge storage well, wherein said first charge storage well has a charge capacity that is at least 50% greater than a charge capacity of said second charge storage well, and wherein said third charge storage well has a smaller charge storage capacity than said first charge storage well and said second charge storage well.

The invention is based on the insight of the inventors that in certain systems, such as the range-gating based imaging system described in more detail below, it is advantageous to have a dual-well pixel (the presence of additional wells is not excluded) whereby one of the charge storage wells has a substantially larger charge capacity than the other charge storage well. The term "well" may designate a single capacitance (electron capacity) produced in a semiconductor circuit by appropriate techniques, or a multitude of interconnected capacities acting jointly as a single storage unit, arranged for example as a cascade. A pixel of this type is particularly useful where the physics of the situation in which the pixel is deployed lead to a predictable asymmetry in the amount of charge to be stored in the different wells, as is the case in a time-of-flight based measuring system requiring high accuracy and a large distance range, resulting in a large photon span.

To the extent that the pixel of the present invention resolves the short-range saturation problem, it removes the need for other work-arounds that extend the operating range at the short end. For example, in systems relying on multiple consecutive measurements for multiple sub-ranges of the desired range (multi-frame systems, where the pulse width varies in function of the distance range to be covered by each frame), the pixel according to the present invention allows for a reduction of the number of measurements (individual frames required to cover the full intended operating range), thus improving the temporal resolution of the sensor.

The pixel according to the present invention preferably comprises a photosensitive element compatible with standard solid-state (semiconductor) circuit production processes.

A third well is provided to perform a variety of functions, provided that it is operated according to a timing scheme that takes into account the timing of the operation of the other wells. In a distance sensing system in which the first well and the second well perform the basic range gating, as described in more detail below, the functions of the third well may include receiving the additional charges that are generated in response to photons arriving from a long-range highly reflective objects (such as a traffic sign or a license plate, outside the time slots in which the first well and the second well are active), producing a regular 2-dimensional image of the scenery (outside the time slots in which the reflections of the projected light arrive, optionally in synchronization with a wide-angle flash light for illuminating the scenery which may consist of a VCSEL array with a diffuser), or performing background light subtraction (by subtracting from the charge levels accumulated in the first well and the second well, an amount of charge accumulated in the third well outside the time slots in which the reflections of the projected light arrive).

The third charge storage well may have a significantly smaller charge storage capacity than the first charge storage well and the second charge storage well, if it is only used for capturing background light, as the background light arriving at the pixel array will typically have been strongly attenuated by the ambient light reduction filters that are preferably provided in a distance sensing system. If the third charge storage well is intended to be used for acquiring 2D images with additional lighting of the scenery (e.g., by means of a flash light) or for capturing reflections from out-of-range highly reflective objects, it may be dimensioned to a similar storage capacity as the first or second charge storage well.

In an embodiment, said pixel further comprises circuitry allowing said pixel to switch between a charging mode, in which light impinging on said pixel causes said first charge storage well or said second charge storage well to increase a stored amount of charge, and a discharging mode, in which light impinging on said pixel causes said first charge storage well or said second charge storage well to decrease a stored amount of charge.

This embodiment is based on the insight of the inventors that in a pulsed system, the "pulse on" intervals are characterized by the presence of projected light and background light, while the part of the "pulse off" intervals occurring after the arrival of the pulse reflection are characterized by the presence of background light only. The inventors developed a method in which by switching the pixel into a "discharging" mode after each exposure that corresponds with a "pulse on" interval, for a period that is equal to the exposure period, the remaining charge in each storage well will be equal to the captured reflection of the projected light without the background light component.

It is an advantage of this embodiment of the pixel according to the present invention that it can be used in a method for subtracting background light from pixels in a pixel array, e.g. as used in a range gating sensor. In particular, it enables a method of subtracting background light from an exposure value of a first pixel in an imaging array, said first pixel receiving a reflection of a spot from a scenery illuminated by a periodically pulsed pattern of spots, said periodically pulsed pattern comprising in alternation an illuminated phase and a non-illuminated phase, the method comprising: accumulating in said first pixel a charge in proportion to a first quantity of incident light, received in said first pixel while detecting said spot during a predetermined amount of time; and decreasing said charge in proportion to a second quantity of incident light received during said predetermined amount of time in absence of said spot.

In an embodiment, said pixel further comprises circuitry allowing photocharges that are generated when an active one of said first charge storage well and said second charge storage well is filled to capacity, to be to deviated to a charge sink without entering a storage well of an adjacent pixel.

It is an advantage of this embodiment that blooming can be avoided, such that high spatial accuracy of spot detection in an array of pixels can be maintained even when individual pixels get saturated, by avoiding spill-over effects to neighboring pixels that can still be used for background measurements or for acquiring a regular 2D image.

In an embodiment, the pixel according to the present invention further comprises a fourth charge storage well.

According to an aspect of the present invention, there is provided an imaging array comprising a plurality of pixels as described above.

According to an aspect of the present invention, there is provided a system for determining a distance to an object comprising: a solid-state light source arranged for projecting a pattern of spots, preferably discrete spots, of light towards the object in a sequence of pulses, preferably a periodically repeated sequence of pulses; a detector comprising an imaging array as described above, the detector being configured for detecting light representing the pattern of spots as reflected by the object in synchronization with said sequence of pulses; and processing means configured to calculate the distance to the object as a function of exposure values generated by said pixels in response to said detected light; wherein the pixels of the imaging array are configured to generate said exposure values by accumulating, for all pulses of said sequence, a first amount of electrical charge representative of a first amount of light reflected by said object during a first predetermined time window and a second electrical charge representative of a second amount of light reflected by said object during a second predetermined time window, said second predetermined time window occurring after said first predetermined time window, wherein the detecting of the first amount of light and the detecting of said second amount of light occurs at said first charge storage well and at said second charge storage well, respectively.

The solid-state light source is preferably a semiconductor light source. The projected discrete spots are preferably spots of laser light.

The system according to the present invention relies on the same physical principles as direct time-of-flight based ranging systems, viz. the fact that light always takes a certain amount of time to travel a given distance. However, the present invention uses range gating to determine the distance travelled by a light pulse that has been transmitted and subsequently reflected by a target object. The present invention is inter alia based on the insight of the inventors that by combining range gating, an at least partially simultaneous spot pattern projection (based on a novel illumination scheme) and a low-power semiconductor light source, a substantially miniaturized, full solid state and energy-efficient long-range distance detection method can be obtained. The term "pattern" as used herein refers to a spatial distribution of simultaneously projected spots, preferably discrete (non-overlapping) spots. In order to determine the position of the detected spot reflection in three-dimensional space, it is necessary to combine the distance information obtained from the ranging step with angular information to fix the remaining two spatial coordinates. A camera comprising a pixel array and suitably arranged optics can be used to provide the additional angular information, by identifying the pixel in which the reflection is detected.

Embodiments of the present invention are based on the further insight of the inventors that in order to be able to use spot patterns generated by solid-state semiconductor light sources in a LIDAR system at the desired ranges, a way to circumvent the optical power limitations is needed. The inventors have found that by prolonging the pulse duration and by integrating the reflected energy of multiple VCSEL-generated light pulses within at least two semiconductor sensor wells or within at least two pixels, followed by a single read-out of the integrated charge, a solid-state LIDAR system can be obtained with a significantly greater operating range than is currently possible with solid-state implementations. In addition, multiple sequences of light pulses, using a different pulse duration in each sequence, may be combined to cover a larger distance range than would be possible with a single sequence. Hereinafter, the term "storage" will be used to designate the well or the pixel in which charge is accumulated in response to the detection of photons.

It is an advantage of the system according to the present invention that the solid-state light source and the solid-state sensor (such as a CMOS sensor, a CCD sensor or the like) may be integrated on the same semiconductor substrate. The solid-state light source may comprise a VCSEL array or a laser with a grating adapted to produce the desired pattern.

Moreover, by assessing the reflected light energy detected in two consecutive time windows, and normalizing for the total accumulated charge in the two consecutive windows, the impact of varying reflectivity of the object under study and the contribution of ambient light can adequately be accounted for in the distance calculation algorithm.

Finally, by using the pixel as described above, the system according to the present invention is less susceptible to saturation of the charge storage wells due to intense reflections received from objects at short range.

In an embodiment, the system is configured to perform the projecting and the detecting for at least two consecutive sequences of pulses, each of the sequences being operated with a different duration of the first predetermined time window and the second predetermined time window.

This embodiment is further based on the insight of the inventors that the range of the system can be improved by splitting up the sensing of the full range over multiple frames (i.e., multiple sequences of pulses), each of which allows computation of the distance for a different range by virtue of operating with different timing parameters (the first predetermined time window and the second predetermined time window).

A judicious choice of these operating parameters can ensure that in each frame, the number of reflected photons expected to be detected for the maximal distance of the desired range corresponds to an amount of charge that can be reliably read out from the charge storage well. On the other hand, the nearest point at which accurate measurements can be carried out is determined by the number of photons that will saturate the capacity of the pixels. The ratio between the minimal detectable number of photons and the maximal number of photons that can be received without saturation determines the distance range that can be spanned in a single frame.

In an embodiment of the system according to the present invention, the imaging array is further adapted to perform 2D video image acquisition.

The 2D video image acquisition may be performed in the same frames in which the range gating takes place, by employing the third charge storage well and/or a fourth charge storage well or by employing pixels of the pixel array that are not being illuminated by reflections of the projected light spots. Additionally or alternatively, the 2D video image acquisition may be performed in the other frames that the frames in which the range gating takes place, optionally in synchronization with a global illumination of the scenery.

BRIEF DESCRIPTION OF THE FIGURES

These and other aspects and advantages of the present invention will now be described in more detail with reference to the accompanying drawings, in which:

FIGS. 7a-7g represent timing diagrams for light projection and detection in embodiments of the present invention, to illustrate the operation of additional wells.

DETAILED DESCRIPTION OF EMBODIMENTS

Figure 1:
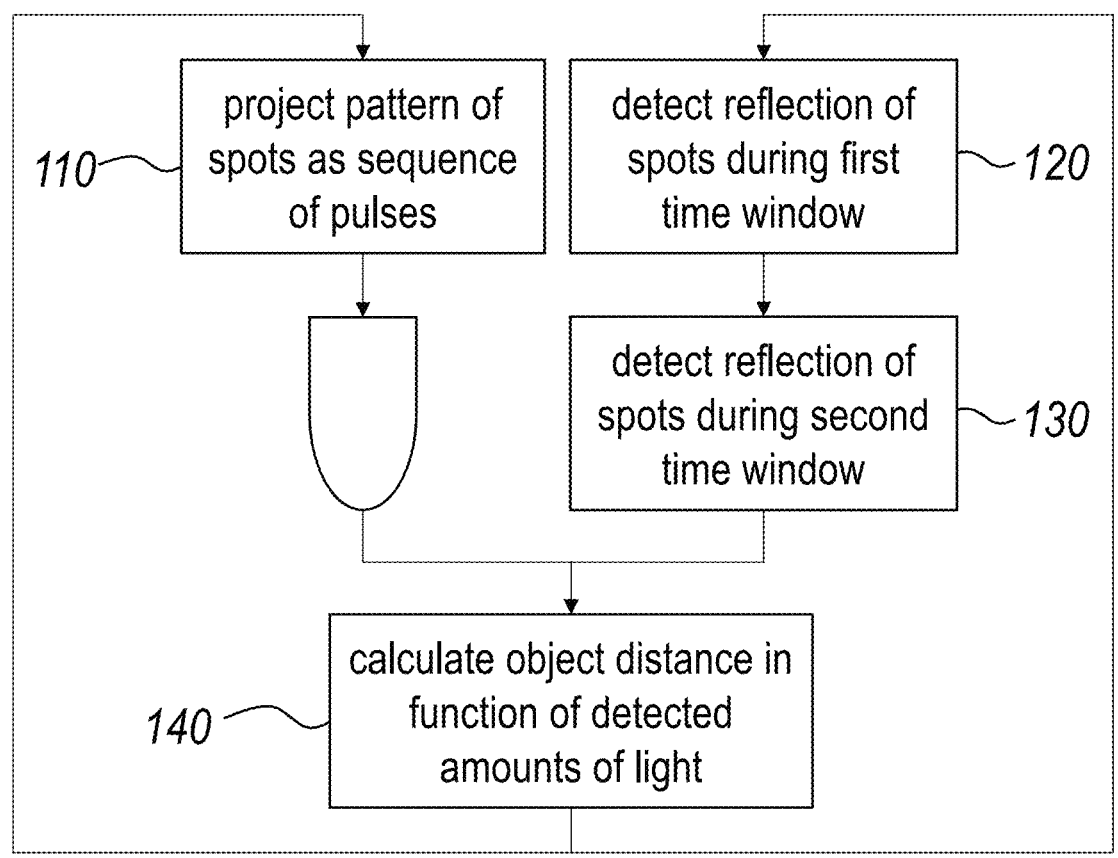
FIG. 1 represents a flow chart of the range gating process applied by an embodiment of the system according to the present invention, in which the pixel according to the present invention may be used.

The inventors have found that the pixel array according to the present invention can advantageously be applied in a novel type of ranging system which aims to achieve the same power/performance characteristics with a compact, semiconductor based time-of-flight based system. Accordingly, an aspect of the present invention concerns a ranging system comprising a plurality of pixels as will be described below, arranged in a pixel array.

In this aspect of the invention, the limitations of the existing LIDAR-based systems are overcome by changing the way the time-of-flight based system operates. The total amount of light energy emitted for each time-of-flight measurement (and thus, the number of photons available for detection at the detector for each time-of-flight measurement) may be increased by increasing the duration of individual pulses and by producing a virtual "composite pulse", consisting of a sequence of a large number of individual pulses. This bundling of extended pulses allowed the inventors to obtain the required amount of light energy (photons) for the desired operational range with low-power solid-state lasers, such as VCSELs.

Where an individual pulse of pre-existing LIDAR systems may have a duration of 1 ns, the presently described systems benefit from a substantially longer pulse duration to partially compensate for the relatively low power level of semiconductor lasers such as VCSELs; in embodiments of the present invention, individual pulses within a sequence may have an exemplary duration of 1 μs (this is one possible value, chosen here to keep the description clear and simple; more generally, in embodiments of the present invention, the pulse duration may for example be 500 ns or more, preferably 750 ns or more, most preferably 900 ns or more). In an exemplary system according to the present invention, a sequence may consist of 1000 pulse cycles, thus adding up to a duration of 1 ms. Given the fact that light would need approximately 0.66 μs to travel to a target at a distance of 100 m and back to the detector, it is possible to use composite pulses of this duration for ranging at distance of this order of magnitude; the skilled person will be able to adjust the required number of pulse cycles in function of the selected pulse width and the desired range. The detection of the sequence preferably comprises detecting the individual pulses in synchronization with the VCSEL-based light source, and accumulating the charges generated in response to the incoming photons at the pixel well level for the entire sequence prior to read-out. The term "exposure value" is used hereinafter to designate the value representative of the charge (and thus of the amount of light received at the pixel) integrated over the sequence. The sequence emission and detection may be repeated periodically.

The ranging system of the present invention operates by using range gating. Range gated imagers integrate the detected power of the reflection of the emitted pulse for the duration of the pulse. The amount of temporal overlap between the pulse emission window and the arrival of the reflected pulse depends on the return time of the light pulse, and thus on the distance travelled by the pulse. Thus, the integrated power is correlated to the distance travelled by the pulse. The present invention uses the principle of range gating, as applied to the sequences of pulses described hereinabove. In the following description, the integration of individual pulses of a sequence at the level of a picture element to obtain a measurement of the entire sequence is implicitly understood.

FIG. 1 represents a flow chart of an applicable ranging method. Without loss of generality, the ranging method is described with reference to a range gating algorithm. In a first time window 10, the method comprises projecting 110 a pattern of spots of laser light (e.g. a regular or an irregular spatial pattern of spots) from a light source comprising a solid-state light source 210 onto any objects in the targeted area of the scenery. The spatial pattern is repeatedly projected in a sequence of pulses.

As indicated above, the solid-state light source may comprise a VCSEL array or a laser with a grating adapted to produce the desired pattern. In order for the system to operate optimally, even at long ranges and with high levels of ambient light (e.g., in daylight), a VCSEL for use in embodiments of the present invention is preferably arranged to emit a maximum optical power per spot per unit of area. Thus, lasers with a good beam quality (low M2-factor) are preferred. More preferably, the lasers should have a minimal wavelength spread; a particularly low wavelength spread can be achieved with monomode lasers. Thus, substantially identical pulses can reproducibly be generated, with the necessary spatial and temporal accuracy.

During the same time window in which a pulse is emitted, or in a substantially overlapping time window, a first amount of light representing the pattern of spots as reflected by the object of interest is detected 120 at a detector, which is preferably arranged as near as possible to the light source. The synchronicity or near synchronicity between the projection 110 of the spot pattern and the first detection 120 of its reflection, is illustrated in the flow chart by the side-by-side arrangement of these steps. In a subsequent second predetermined time window 20, a second amount of light representing the reflected light spot is detected 130 at the detector. During this second window 20, the solid-state light source is inactive. The distance to the object can then be calculated 140 as a function of the first amount of reflected light and the second amount of reflected light.

The first predetermined time window 10 and the second predetermined time window 20 are preferably back-to-back windows of substantially equal duration, to facilitate noise and ambient light cancellation by subtracting one of the detected amounts from the other one. An exemplary timing scheme will be described in more detail below in conjunction with FIG. 3.

The detector comprises a pixel array as described above with adequate optics arranged to project an image of the scenery (including the illuminated spots) onto the picture element.

The term "picture element" as used herein may refer to an individual light-sensitive area or well of a pixel, or to an entire pixel (which may comprise multiple wells, see below). For every given projected spot, the detecting 120 of the first amount of light and the detecting 130 of the second amount of light occurs at the same one or the same group of the plurality of picture elements.

Without loss of generality, each of the picture elements may be a pixel comprising at least two charge storage wells 221, 222, such that the detecting 120 of the first amount of light and the detecting 130 of the second amount of light can occur at the respective charge storage wells 221, 222 of the same pixel or pixel group. The third well may perform a variety of functions, provided that it is operated according to a timing scheme that takes into account the timing of the projector and/or the other wells.

Figure 2:
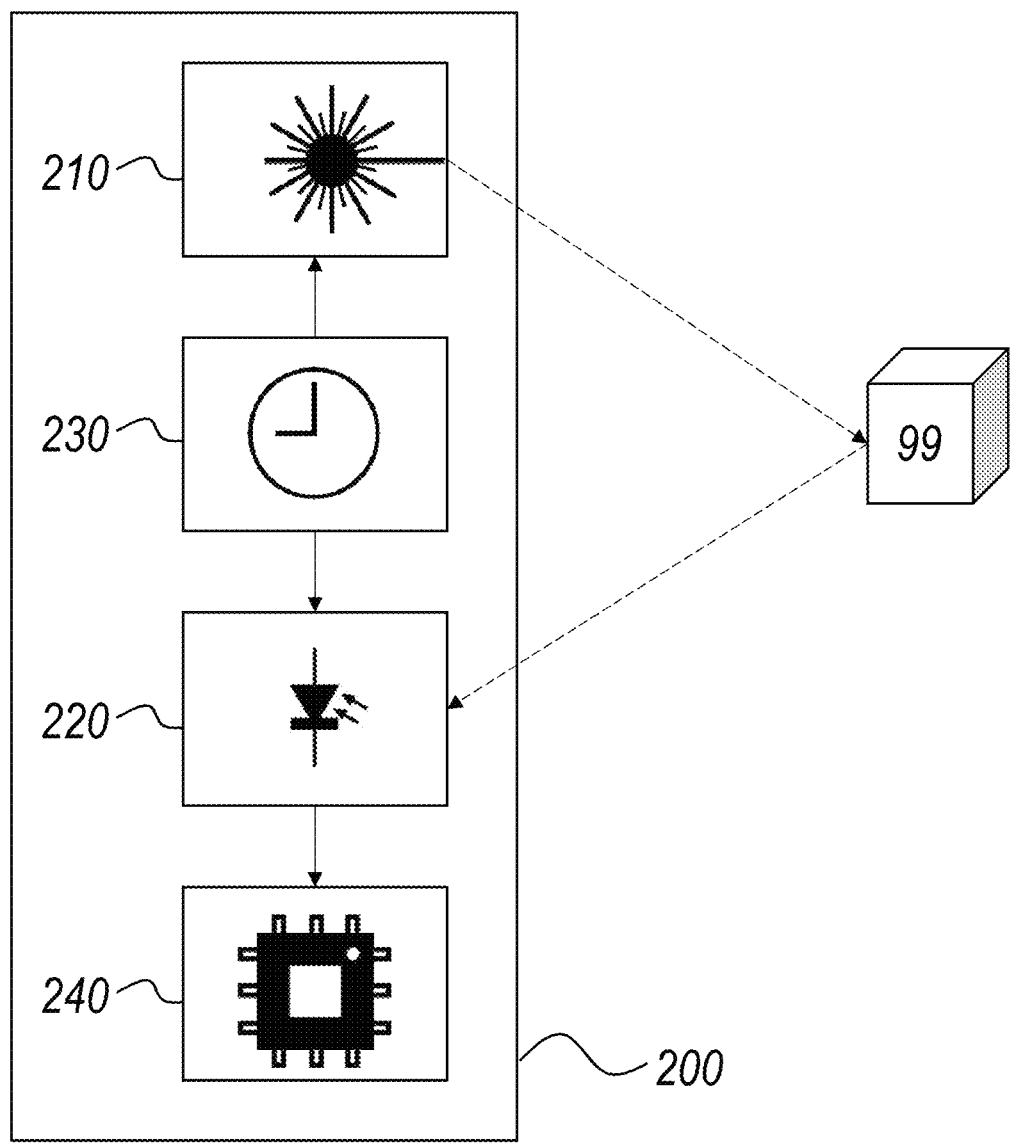
FIG. 2 schematically represents an embodiment of the system according to the present invention, in which the pixel according to the present invention may be used.

FIG. 2 schematically represents an embodiment of the system according to the present invention, in relation to an object 99 in the scenery of interest. The system 200 comprises a solid-state light source 210 for projecting a pattern of a sequence of spots, which may be repeated periodically, onto the object 99. A detector 220 is arranged near the light source and configured to detect light reflected by the object.

The light beam bouncing off the object 99 is illustrated as an arrow in dashed lines, travelling from the light source 210 to the object 99 and back to the detector 220. It should be noted that this representation is strictly schematic, and not intended to be indicative of any actual relative distances or angles.

A synchronization means 230, which may include a conventional clock circuit or oscillator, is configured to operate the solid-state light source 210 so as to project the pattern of spots onto the object during first predetermined time windows 10 and to operate the detector 220 so as to detect a first amount of light representing the light spot(s) reflected by the object 99 at substantially the same time. It further operates the detector 220 to detect a second amount of light representing the light spots reflected by the object 99, during respective subsequent second predetermined time windows 20. Appropriate processing means 240 are configured to calculate the distance to the object as a function of the first amount of reflected light and the second amount of reflected light.

Figure 3A:
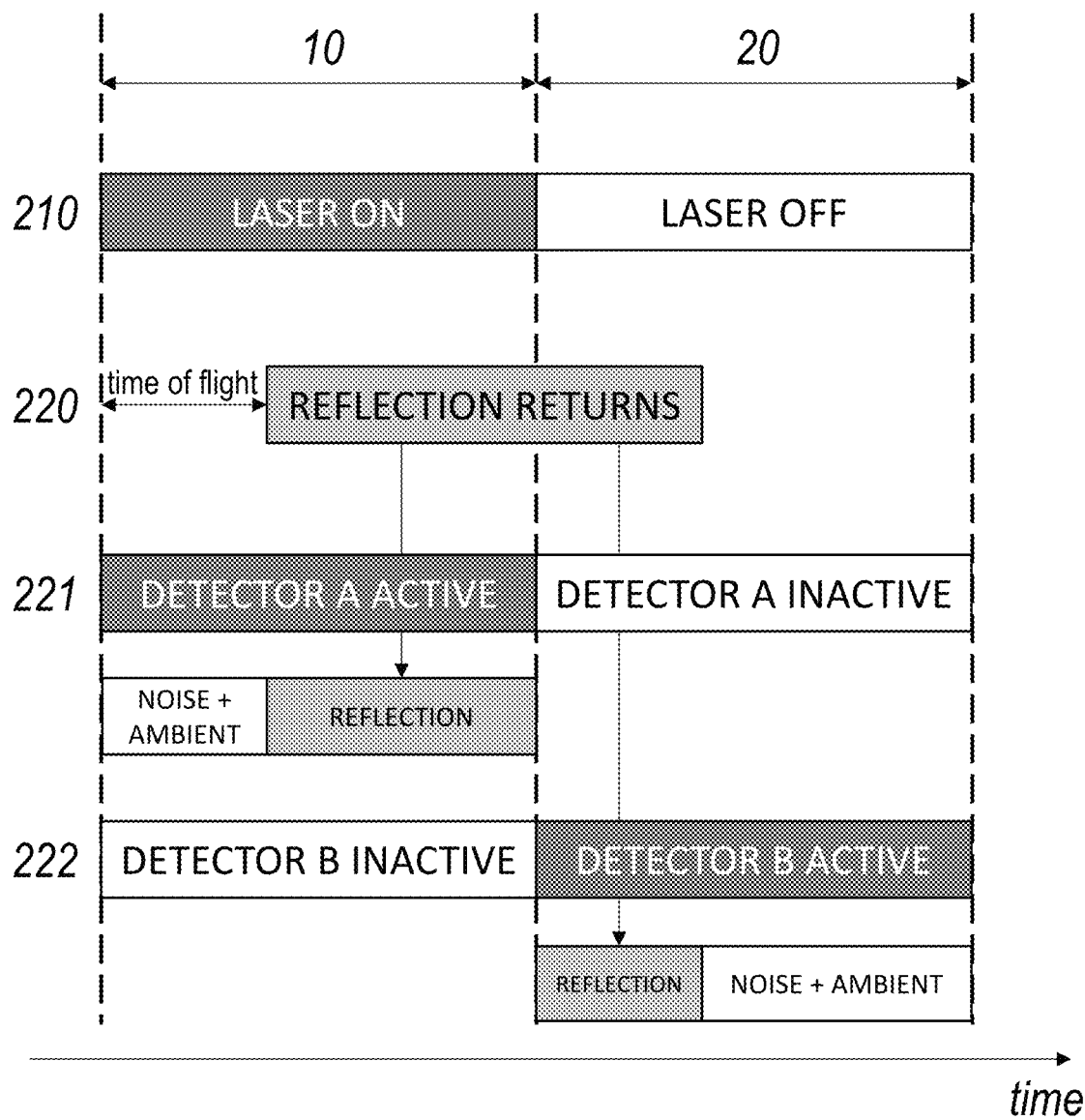
FIGS. 3a-c present timing schemes of the range gating process applied by an embodiment of the system according to the present invention, to illustrate the operation of the two wells involved in range gating.
Figure 3B:
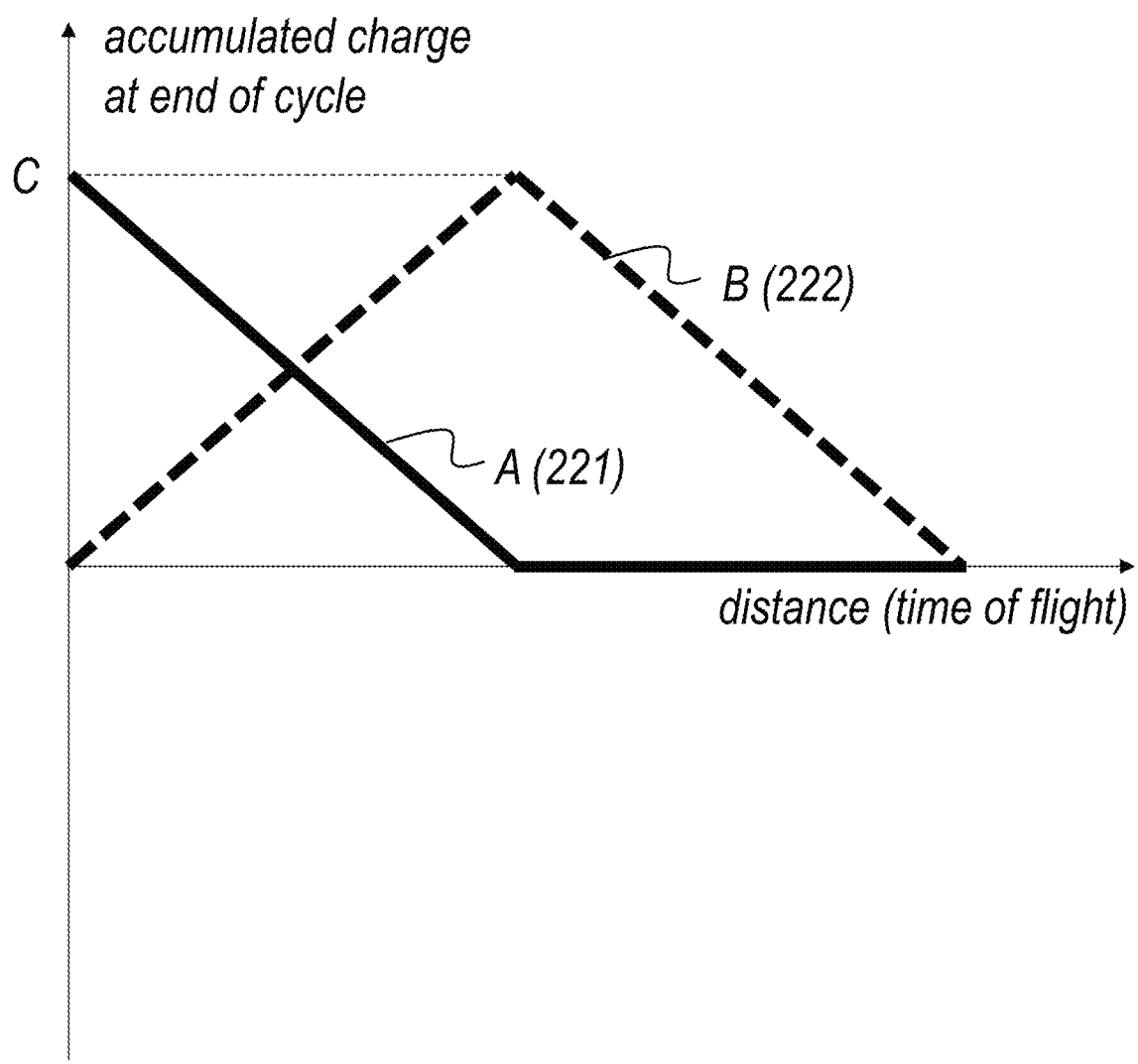
Figure 3C:
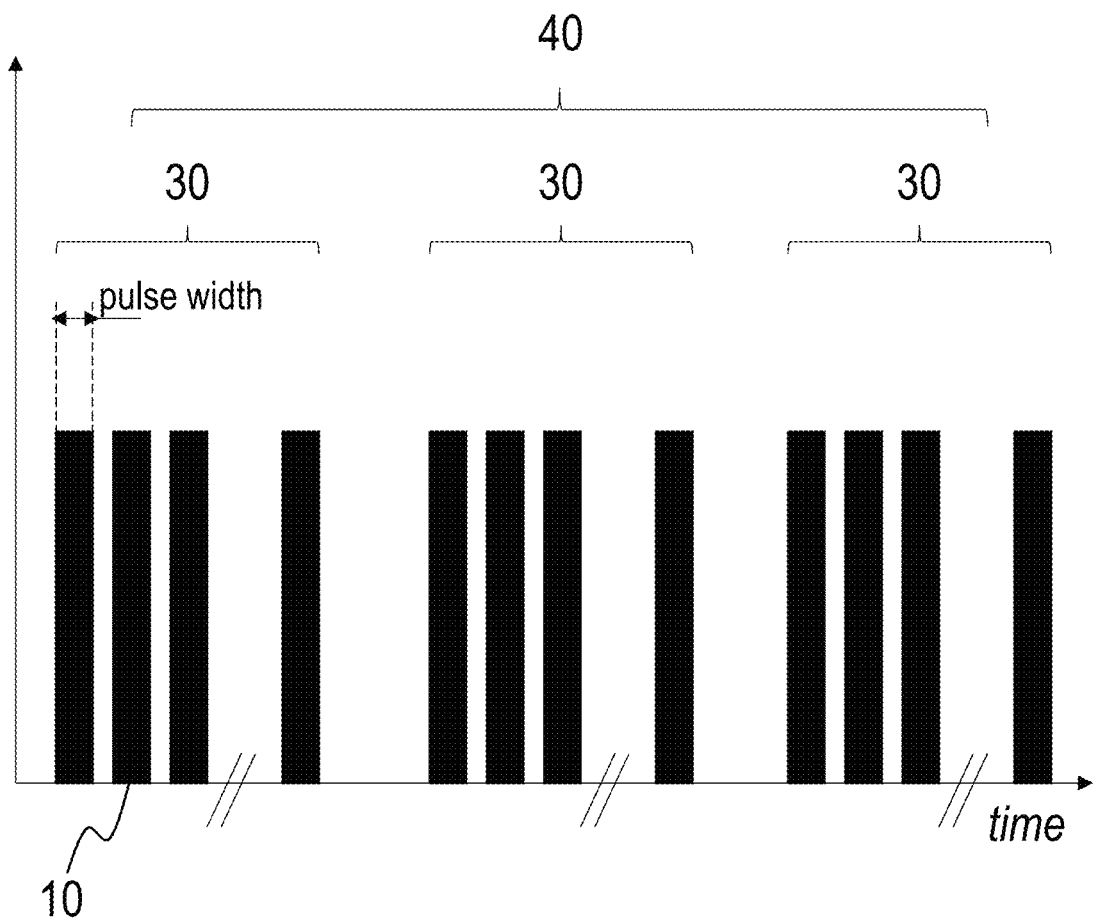

FIG. 3 (consisting of FIGS. 3a, 3b, and 3c) represents a timing diagram for light projection and detection in embodiments of the present invention. For clarity reasons, only a single pulse of the pulse sequence which is repeated periodically of FIG. 3 is illustrated, which consists of a first time window 10 and a second time window 20.

As can be seen in FIG. 3a, during the first time window 10, the solid-state light source 210 is in its "ON" state, emitting the pattern of light spots onto the scenery. During the second time window 20, the solid-state light source 210 is in its "OFF" state.

The arrival of the reflected light at the detector 220 is delayed relative to the start of the projection by an amount of time that is proportional to the distance travelled (approximately 3.3 ns/m in free space). Due to this delay, only a part of the reflected light will be detected at the first well 221 of the detector 220, which is only activated during the first time window 10. Thus, the charge accumulated in this first well during its period of activation (the first time window 10) consists of a part representing only the noise and the ambient light impinging on the pixel prior to the arrival of the reflected pulse, and a part representing the noise, the ambient light, and the leading edge of the reflected pulse.

The latter part of the reflected pulse will be detected at the second well 222 of the detector 220, which is only activated during the second time window 20, which preferably immediately follows the first time window 10. Thus, the charge accumulated in this second well during its period of activation (the second time window 20) consists of a part representing the noise, the ambient light, and the trailing edge of the reflected pulse, and a part representing only the noise and the ambient light impinging on the pixel after the arrival of the reflected pulse.

The greater the distance between the reflecting object 99 and the system 200, the smaller the proportion of the pulse that will be detected in the first well 221 and the larger the proportion of the pulse that will be detected in the second well 222.

If the leading edge of the reflected pulse arrives after the closing of the first well 221 (i.e., after the end of the first time window 10), the proportion of the reflected pulse that can be detected in the second well 222 will decrease again with increasing time of flight delay.

The resulting amounts of charge A, B in each of the respective wells 221, 222 for varying distances of the object 99 are shown in FIG. 3b. To simplify the representation, the effect of the attenuation of light with distance, according to the inverse square law, has not been taken into account in the diagram. It is clear that for time of flight delays up to the combined duration of the first time window 10 and the second time window 20, the time of flight delay can in principle unambiguously be derived from the values of A and B:

For time of flight delays up to the duration of the first time window 10, B is proportional to the distance of the object 99. To easily arrive at a determination of the absolute distance, the normalized value B/(B+A) may be used, removing any impact of non-perfect reflectivity of the detected object and of the inverse square law.

For time of flight delays exceeding the duration of the first time window 10, A consists of daylight and noise contributions only (not illustrated), and C-B is substantially proportional (after correcting for the inverse square law) to the distance of the object 99, where C is an offset value.

While FIGS. 3a and 3b illustrate the principle of the system according to the present invention in relation to a single pulse emitted in the time window 10, it shall be understood that the illustrated pulse is part of a sequence of pulses as defined above. FIG. 3c schematically illustrates exemplary timing characteristics of such a sequence. As illustrated, the illumination scheme 40 consists of a repeated emission of a sequence 30 of individual pulses 10. The width of the individual pulses 10 is determined by the maximal operating range. The entire sequence may be repeated at a frequency of, for example, 60 Hz.

The inventors have found that in systems such as described herein, reflections of light by objects at a short distances are more likely to cause pixel saturation, because the attenuation of such a reflection will be much less than that of a reflection originating from a more distant object (due to the inverse-square law of light attenuation over distance). As certain applications, such as automotive applications, require accurate system operation up to relatively long distances, a large photon span must be covered between the nearest distances of operation and the farthest distances of operation. With these constraints, pixel saturation at short range is a very real risk, in particular at the first well (which receives the bulk of the reflection at short range). The inventors have found that for given total pixel space, the saturation problem can be mitigated by using an asymmetric well arrangement, in which the photon capacity represented by the first well is increased, and the photon capacity represented by the second well is decreased. If the increase and decrease are balanced, an increase of the dynamic range can be obtained at no additional pixel surface cost.

The inventors have further found that to obtain a useful operating range (between the lowest detectable light level and the light level at which saturation occurs), the first charge storage should have a charge capacity that is at least 50% greater than the charge capacity of the second charge storage well. Preferably, the first charge storage should have a charge capacity that is at least 75% greater than the charge capacity of the second charge storage well, and most preferably the first charge storage should have a charge capacity that is at least 100% greater than the charge capacity of the second charge storage well.

Figure 4:
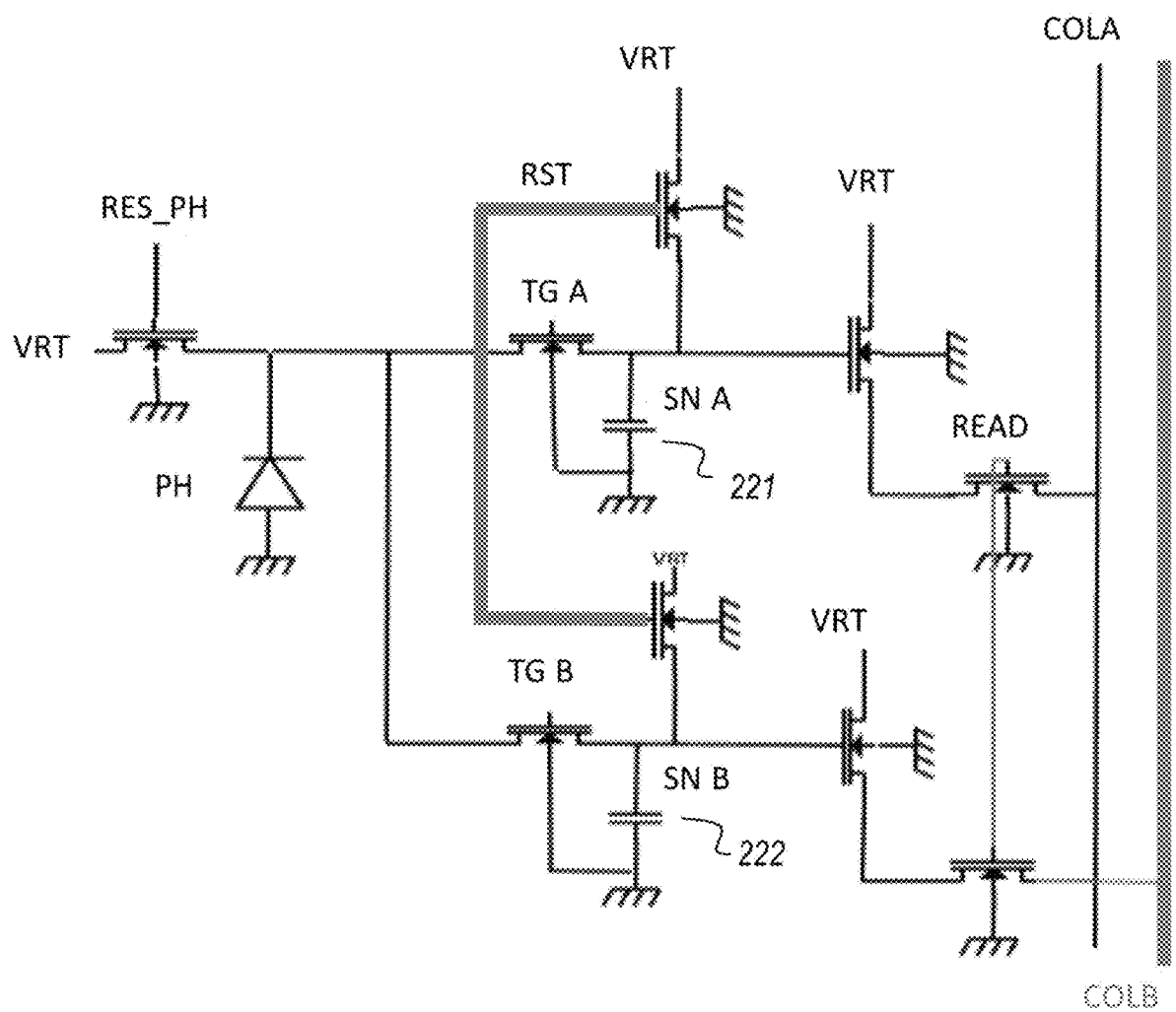
FIG. 4 schematically represents an embodiment of the pixel according to the present invention.

An exemplary asymmetric dual-well pixel according to the present invention, including anti-blooming circuitry, is schematically presented in FIG. 4. The charge storage wells 221, 222 (SN A, SN B) are connected to a photactive region (PH) by means of transfer gates (TG A, TG B), which are controlled to synchronize the active states of the two charge storage wells with the transmission of the projection pulses as described above.

Figure 5:
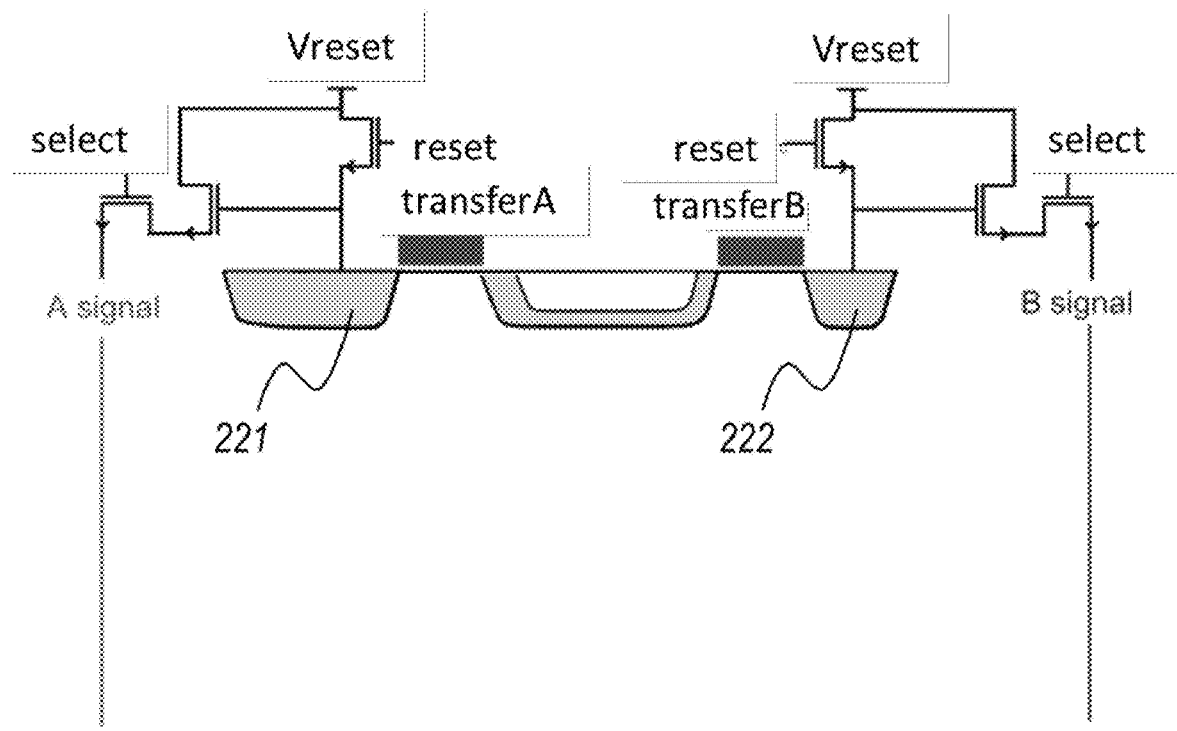
FIG. 5 schematically represents an embodiment of the pixel according to the present invention, showing a first way of obtaining the asymmetry of the wells.

FIG. 5 schematically represents an embodiment of the pixel according to the present invention, showing a first way of obtaining the asymmetry of the wells. As shown in FIG. 5, the first well 221 (the depletion zone on the A-signal side) has been made at least 50% larger than the second well 222 (the depletion zone on the B-signal side) during the semiconductor fabrication process.

Figure 6:
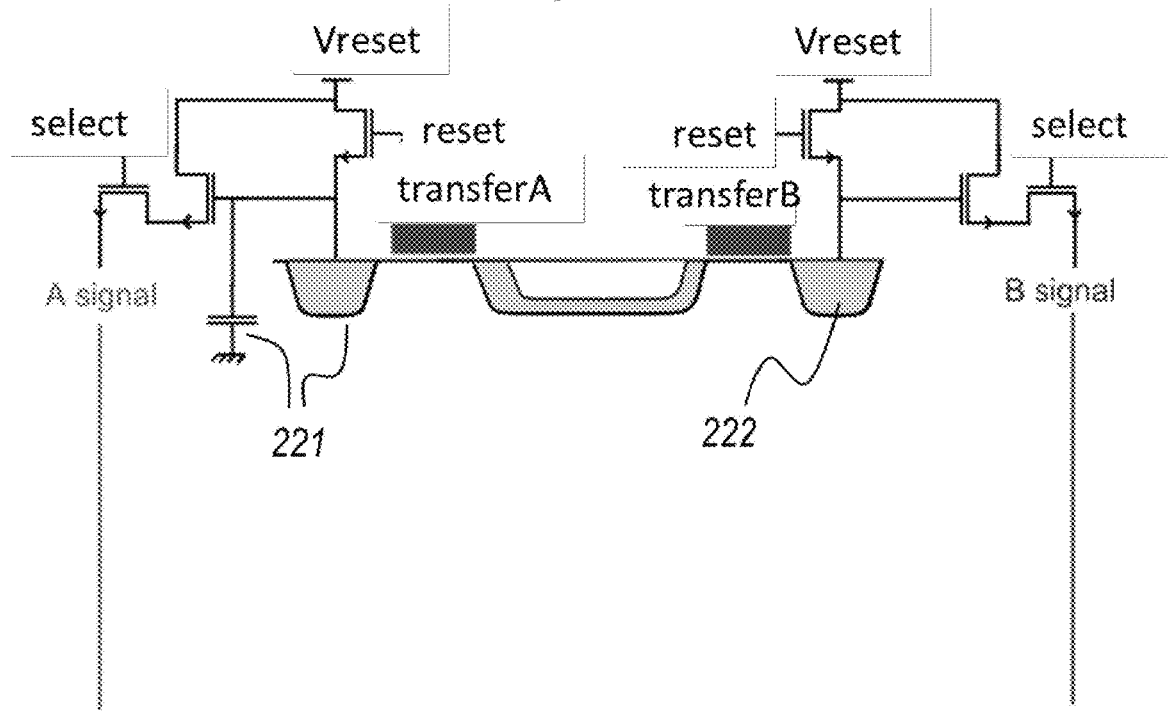
FIG. 6 schematically represents an embodiment of the pixel according to the present invention, showing a second way of obtaining the asymmetry of the wells.

FIG. 6 schematically represents an embodiment of the pixel according to the present invention, showing a second way of obtaining the asymmetry of the wells. In this case, both semiconductor wells 221, 222 are of identical side, but an additional capacitor is provided on the A-signal side to increase the effective capacity of the first well 221.

Blooming is a phenomenon that happens when the charge in a pixel exceeds the saturation level of that specific pixel. Consequently, the charge starts to overflow and causes nuisance in adjacent pixels. This creates inaccurate data in the neighboring pixels, or in other wells of the same pixel. Preferably, the pixels of the system according to the present invention are provided with anti-blooming electronics, to bleed off the excess charge before it saturates the relevant well and spills over to the wells of adjacent pixels. In particular when the information from neighboring spots is used for the elimination of background light, it is of great importance to have an accurate estimation of the background light which is obtained independently (and without contamination from) neighboring pixels.

The pixel may further comprise circuitry allowing the pixel to switch between a charging mode and a discharging mode. In the charging mode, light impinging on said pixel causes the first charge storage well or the second charge storage well (according to the present stage of the illumination scheme) to increase a stored amount of charge. In the discharging mode, preferably activated after the charging mode for an equal amount of time, light impinging on said pixel causes said first charge storage well or said second charge storage well to decrease the stored amount of charge. This switching scheme allows an amount of charge corresponding to the background light to be removed from the charge storage wells.

Embodiments of the present invention may employ correlated double sampling to correct the samples for the thermal noise related to the capacity of the wells (also designated as "kTC noise"). To this end, the electronics of the pixel may be designed to carry out a differential measurement between the reset voltage ($V_{reset}$) and the signal voltage ($V_{signal}$), for example by measuring $V_{reset}$ at the beginning of the frame and measuring $V_{signal}$ at the end of the frame. As an alternative to an electronic (in-pixel) implementation, correlated double sampling may also be implemented by digitally subtracting the read-out signals ($V_{signal}$ $V_{reset}$) in a processor.

To increase the amount of light that reaches the photosensitive elements (in particular diodes) in the pixel structure, embodiments of the present invention may use backside illumination; in that case, the pixel circuitry is behind the photosensitive layer, thus reducing the number of layers that must be traversed by the impinging photons to read the photosensitive elements.

In addition to being applicable in the system described above, the pixel and the pixel array according to the present invention may also be integrated with a triangulation-based system in accordance with WO 2015/004213 A1. If miniaturization is aimed for, the triangulation-based system will end up having a relatively small distance between its projector and its detector, thus leaving it with a reduced operating range. However, it is precisely at short range that the combination presents its benefit, because the triangulation-based system can cover the distances at which the time-of-flight based system cannot operate sufficiently accurately.

The entire ranging process may be repeated iteratively, preferably periodically, so as to monitor the distance to the detected object or objects over time. Thus, the result of this method can be used in processes that require information about the distance to detected objects on a continuous basis, such as advanced driver assistance systems, vehicles with an active suspension, or autonomous vehicles.

The entire ranging process may be repeated iteratively, so as to monitor the distance to the detected object or objects over time. Thus, the result of this method can be used in processes that require information about the distance to detected objects on a continuous basis, such as detection and tracking of objects in the surroundings of a vehicle, advanced driver assistance systems, vehicles with an active suspension, autonomous driving or autonomous vehicles. An iteratively repeated range gating sequence is schematically represented in the timing diagram of FIG. 7a, in which each frame corresponds of a sequence of pulses of the projector (P) (the timing of the pulses is indicated by the lowercase 'p'), which is synchronized to activations of the imager (I) (the accumulation of charges in the first well is indicated by the lowercase 'a', while the accumulation of charges in the second well is indicated by the lowercase 'b'). Without loss of generality, only two consecutive frames are illustrated.

Figures 7A, 7B, 7C:
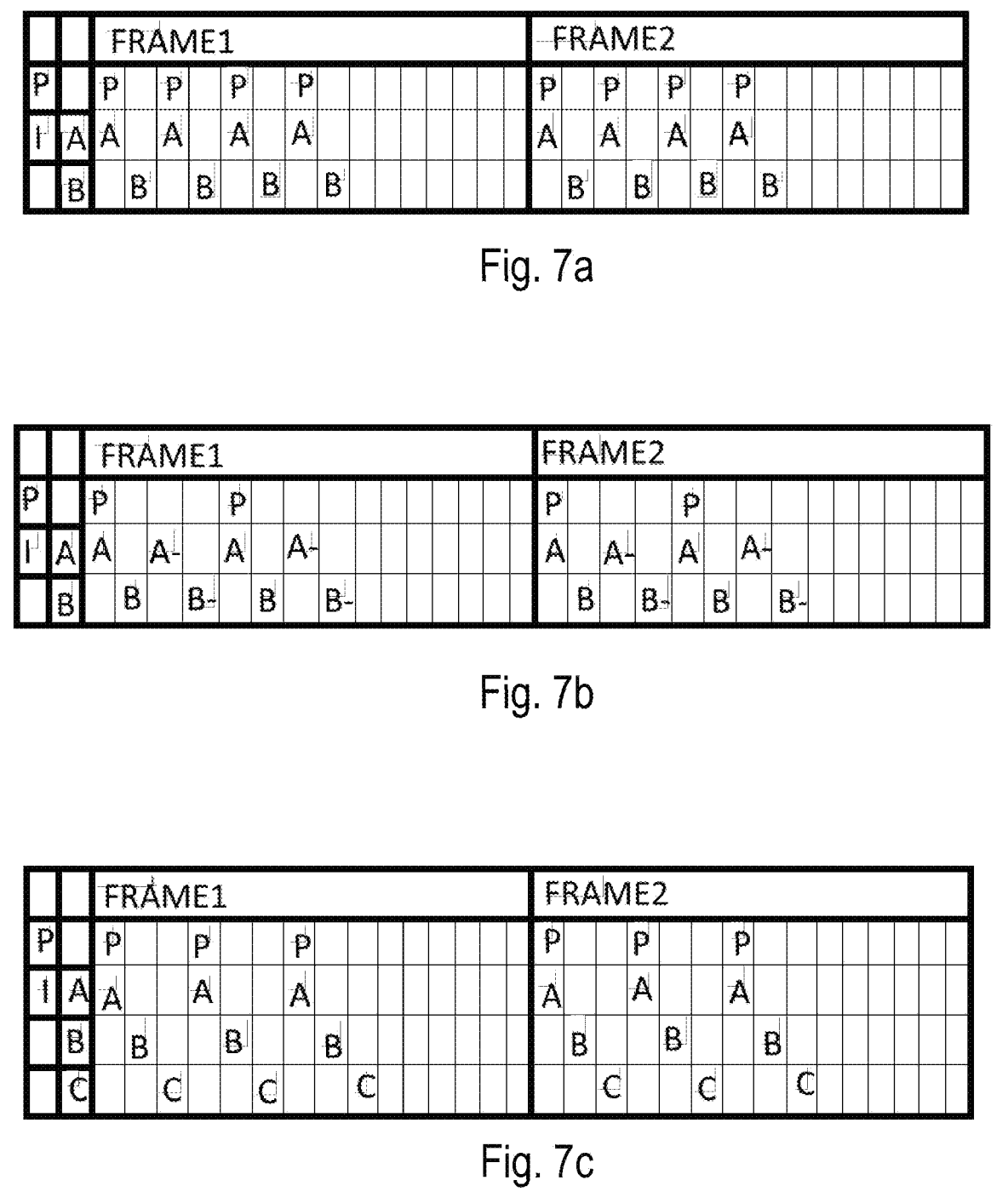

FIG. 7b represents a modified timing scheme, containing two additional time slots for every projection pulse. These additional time slots are used to discharge the respective wells at a rate proportional to the intensity of the light impinging on the pixel when no reflection of the projected light is received. As the light received in the absence of a pulse represents the background light, with only a tiny time offset relative to the point in time at which the pulse reflection is received, this scheme effectively removes the background light component from the charge accumulated in the first well and the second well, for each projector pulse.

In order to implement the above mentioned discharging phase, the pixel may comprise a capacitor for storing the charge, coupled to the photodiode by appropriate transfer gates. The accumulating phase then comprises transferring charges to a first side of the capacitor, and the decreasing comprises transferring charges to the second side of the capacitor.

The following timing diagrams illustrate how additional wells (e.g. the aforementioned third charge storage well and fourth charge storage well) may be used.

FIG. 7c represents a modified timing scheme, containing one additional time slot for every projection pulse. This additional time slot is used to accumulate photocharges in a third well (the accumulation of charges in the third well is indicated by the lowercase 'c'). As the light received in the third well arrives in the absence of a pulse, it represents the background light, with only a tiny time offset relative to the point in time at which the pulse reflection is received. The charge accumulated in the third well may therefore be subtracted from the charges in the first well and the second well to effectively remove the background light component from the latter charges. The light received in the third well may also include reflections of projected spots arriving from highly reflective objects outside the range covered by the operation of the first well and the second well, and the accumulated charges may accordingly be used to detect such objects. The light received in the third well may also be used to generate a 2D image of the scenery, which may optionally be combined with the ranging information obtained from the operation of the first well and the second well to create a 3D image.

Figures 7D, 7E, 7F:
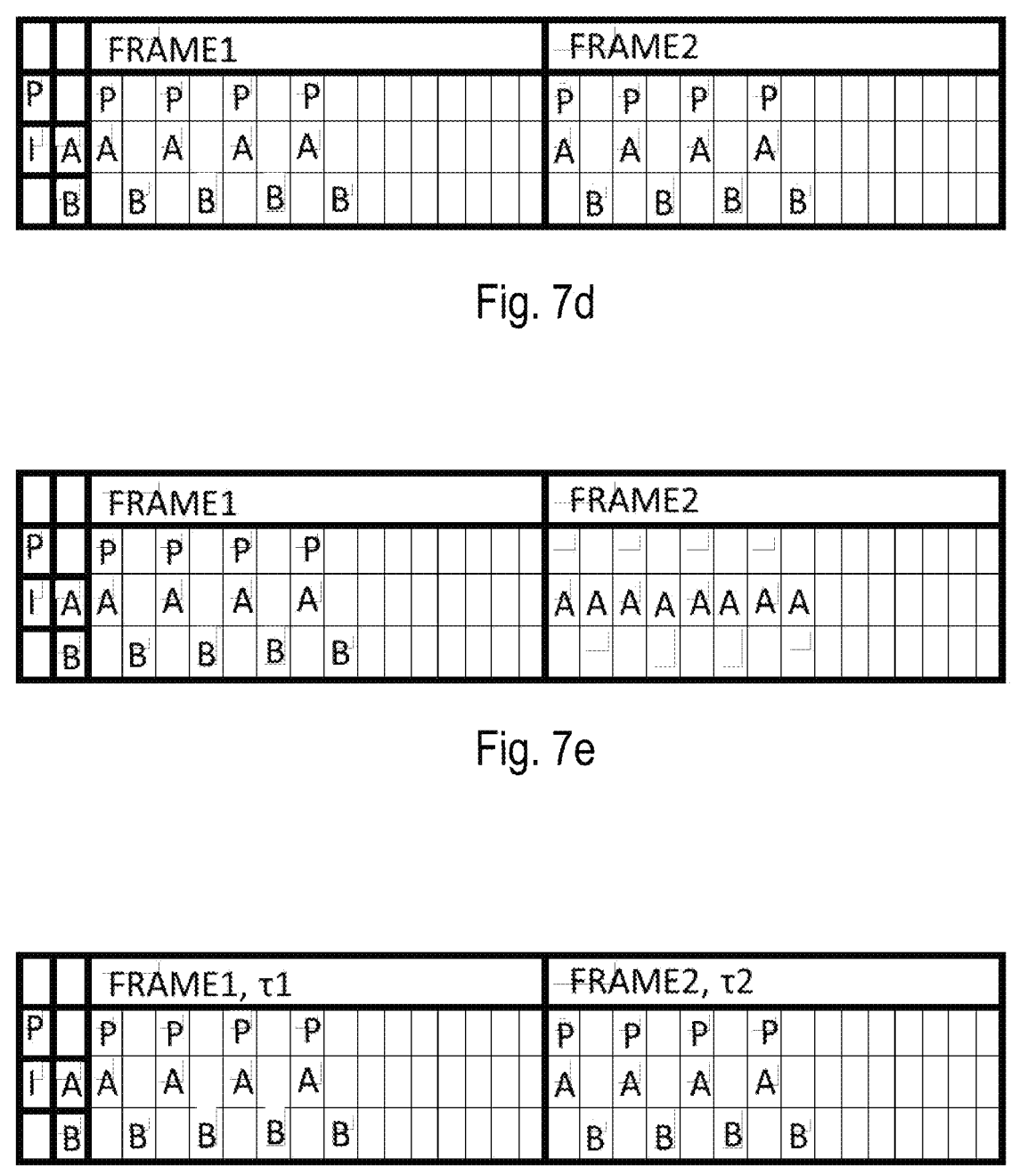

FIG. 7d represents a variant of the timing scheme of FIG. 7c, in which the third well is activated during a number of time slots after the completion of the same number of projector pulses. As the light thus received in the third well arrives in the absence of a pulse, it represents the background light, with only a slightly larger time offset relative to the points in time at which the pulse reflection is received. The charge accumulated in the third well may therefore be subtracted from the charges in the first well and the second well to effectively remove the background light component from the latter charges. The charge accumulated in the third well in the separate time slots may also be used to generate a 2D image of the scenery, in which case the scenery may optionally be illuminated by a flash light.

FIG. 7e represents yet another variant of the timing scheme of FIG. 7c, in which the first well is activated in a separate frame, after the completion of a range-gating frame in which the projector and the first and second well are active. As the light thus received in the first well arrives in the absence of a pulse, it represents the background light, with again a slightly larger time offset relative to the points in time at which the pulse reflection is received. The charge accumulated in the first well in the separate frame may therefore be subtracted from the charges previously accumulated in the first well and the second well to effectively remove the background light component from the latter charges. The charge accumulated in the first well in the separate frame may also be used to generate a 2D image of the scenery, in which case the scenery may optionally be illuminated by a flash light.

The combination of the large desired operational range (in the order of 200 m) and the high desired accuracy (correctly detect as few as 1000 photons at the furthest point) results in a huge span between the largest number of photons that may be received in one well in one frame (in the case of reflections at short range), and the lowest number that may be received in one well in one frame.

FIG. 7f represents a modified timing scheme, which differs from the scheme of FIG. 7a in that the duration of a single time slot varies from one slot to the next. In this way, the detection threshold and the saturation point for different frames will occur at different distances, and the information obtained from a number of consecutive frames may be combined to obtain accurate distance measurements for both nearby objects and far-away objects.

Figure 7G:
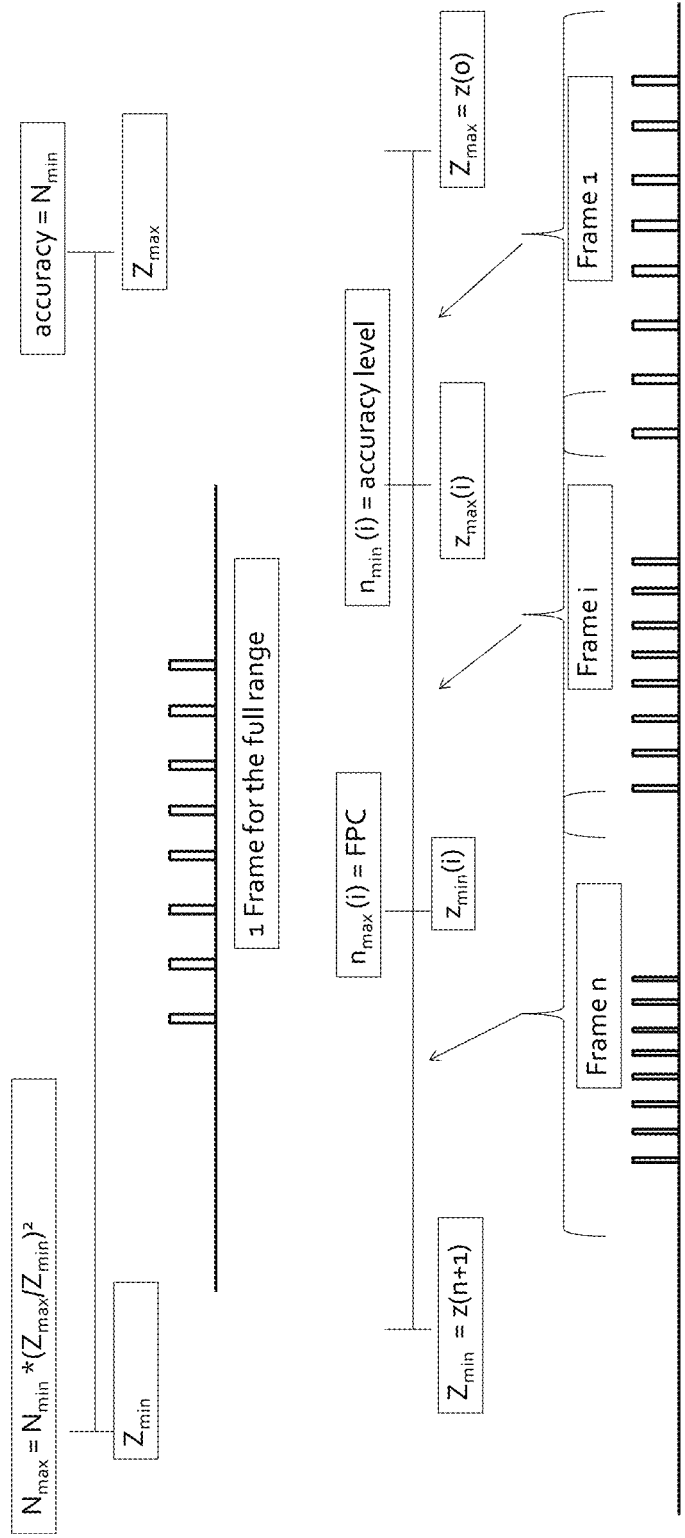

FIG. 7g schematically illustrates how the individual frames in the sequence of FIG. 3c, which may fail to cover the entire targeted range of distances $[Z_{min}, Z_{max}]$ as a result of the constraints imposed by $N_{max}$ (maximal number of electrons that can be stored without saturating the pixel) and $N_{min}$ (minimum number of pixels required for accurate read-out), can be broken down into sequences with different timing parameters, each covering a portion of the targeted range $[z_{min}(i), z_{max}(i)]$ that can more easily be covered within the same constraints on the number of photons.

With reference to the symbols introduced above and used in FIG. 7g, the corresponding electron amounts $n_{min}(i)$ and $n_{max}(i)$ of the subranges are defined by:

The maximum allowable number of electrons (using "FPC" for the full pixel capacity, which corresponds to full well capacity in case there are no additional capacities):

$$n_{max} = N_{min} \times \left(\frac{z(i)}{z(i+1)}\right) \le FPC,$$

with $z(0)=Z_{max}$

The minimum required accuracy level: $n_{min}=N_{min}$
$Z_{max}(i)=z_{min}(i-1)$
Additionally, the pulse characteristics can be determined as follows:
the pulsewidth $$\tau(i) = \frac{z_{max}(i)}{c}$$

the total "on" time is reduced proportionally to $$\frac{N_{max}}{N_{min}}$$

to respect the limits imposed by the full pixel capacity and the accuracy level.

The above principles may be further clarified by the following non-limiting numerical example.

A Lambertian reflecting surface with 10% reflectivity at a distance of 150 m must provide 1000 electrons to obtain an accuracy of 1.6%. At the same distance, a 100% reflecting surface will generate 10000 electrons. With a full well capacity of 200000 electrons, the following multi-frame solution is proposed:

|  | Sub-range | Pulse Width | Total "on" time |
| --- | --- | --- | --- |
| Frame 1 | 150 m-33 m | 1 μs | 1 ms |
| Frame 2 | 7.4 m-33 m | 22 ns | 50 μs |
| Frame 3 | 1.65 m-7.4 m | 4.9 ns | 2.5 μs |
| Frame 4 | 0.37 m-1.65 m | 1.1 ns | 0.125 μs |

It should be noted that for robustness reasons, it may be advantageous to provide an overlap in the subranges.

For assuring the same 3D resolution, it may be advantageous to use a faster camera: e.g., a camera operating at 180 Hz with 3-frame interleaving gives the same data speed as a 60 Hz with single frame operation.

Depending on the mode in which a system according to the present invention is used (as exemplified in FIGS. 7a-7g), the duty cycle will vary. It can easily be seen that when some frames are used for capturing out-of-range reflections or acquiring a 2D image, a smaller fraction of time is available for the actual ranging. It is an advantage of the use of three-well or four-well pixel according to the present invention that several functions can be performed simultaneously.

Blooming is a phenomenon that happens when the charge in a pixel exceeds the saturation level of that specific pixel (as in the case of short-range reflections or reflections from highly reflective surfaces such as traffic signs or license plates). Consequently, the charge starts to overflow and causes nuisance in adjacent pixels. This creates inaccurate data in the neighboring pixels. Preferably, the pixels of the system according to the present invention are provided with anti-blooming electronics, which may in particular include a fourth well, to bleed off the excess charge before it saturates the relevant well and spills over to the wells of adjacent pixels. In particular when the information from neighboring spots is used for the elimination of background light, it is of great importance to have an accurate estimation of the background light which is obtained independently (and without contamination from) neighboring pixels. Likewise, when the pixels that do not receive spot reflections are used to simultaneously generate a regular 2D image, it is highly desirable that pixels adjacent to pixels receiving a spot reflection are not affected by charge spills from the latter pixels.

In order for all elements of the system as described to operate optimally, the system has to be thermally stable. Thermal stability avoids, among other things, undesired wavelength shifts of the optical elements (thermal drift), which would otherwise impair the proper functioning of the optical filters and other elements of the optical chain. Embodiments of the system according to the present invention achieves thermal stability by their design, or by active regulation by means of a temperature control loop with a PID-type controller.

WO 2015/004213 A1 discloses various techniques to minimize the amount of ambient light that reaches the pixels during the detection intervals, thus improving the accuracy of the detection of the patterned laser spots. While these techniques have not been disclosed in the context of a LIDAR system, the inventors of the present invention have found that several such techniques yield excellent results when combined with embodiments of the present invention. This is particularly true for the use of narrow bandpass filters at the detector, and the use of adequate optical arrangements to ensure nearly perpendicular incidence of the reflected light onto the filters. The details of these arrangements as they appear in WO 2015/004213 A1 are hereby incorporated by reference. Further features and details are provided hereinafter.

European patent application publication nos. EP 3045935 B1 and EP 3045936 B1, both in the name of the present applicant, disclose optical arrangements that may be used in conjunction with the system disclosed in the present application to further minimize the amount of ambient light that reaches the pixels during the detection intervals. The details of these arrangements as they appear in EP 3045935 B1 and EP 3045936 B1 are hereby incorporated by reference. Accordingly, a pixel according to the present invention may be provided with a microlens in order to guide the impinging light, after optional filtration, to the photosensitive region.

While these various techniques may be applied to embodiments of the present invention to minimize the amount of ambient light that reaches the pixels during the detection intervals, a certain amount of ambient light cannot be avoided. In a multi-pixel system, only some of the pixels will be illuminated by reflected spots, while others will be illuminated by residual ambient light only. The signal levels of the latter group of pixels can be used to estimate the contribution of the ambient light to the signals in the pixels of interest, and to subtract that contribution accordingly.

In some embodiments, the detector may be a high dynamic range detector, i.e. a detector having a dynamic range of at least 90 dB, preferably at least 120 dB. The presence of a high dynamic range sensor, i.e. a sensor capable of acquiring a large amount of photons without saturation while maintaining sufficient discrimination of intensity levels in the darkest part of the scene, is an advantage of the use of such a sensor; it allows for a sensor that has a very long range and yet remains capable of detection objects at short distance (where the reflected light is relatively intense) without undergoing saturation. The inventors have found that the use of a high dynamic range sensor not based on tone mapping is more advantageous than the use of a sensor that applies tone mapping. In tone mapping, the sensor linear range is compressed towards the higher resolution. In literature, several compression methods are documented, such as logarithmic compression or multilinear compression. However, this non-linear compression necessitates relinearization of the signals before performing logical or arithmetic operations on the captured scene to extract the relief information. The solution according to the invention therefore increases detection accuracy without increasing the computational requirements. It is a further advantage of some embodiments to use a fully linear high dynamic range sensor. A pixel architecture and an optical detector that are capable of providing the desired dynamic range characteristics are disclosed in US patent application publication no. US 2014/353472 A1, in particular paragraphs 65-73 and 88, the content of which is incorporated by reference for the purpose of allowing the skilled person to practice this aspect of the present invention.

Embodiments of the present invention use a high dynamic range pixel. This can be obtained by a sizeable full-well capacity of the charge reservoirs or by designs limiting the electronic noise per pixel or by usage of CCD gates that do not add noise at charge transfer, or through a design with a large detection quantum efficiency (DQE) (e.g., in the range of 50% for front illumination or 90% in case of back illumination, also known as back thinning), or by a special design, or by any combination of the listed improvements. Furthermore, the dynamic range can be further enlarged by adding an overflow capacity to the pixel in overlay at its front side (this implementation requires back thinning). Preferably, the pixel design implements an anti-blooming mechanism.

A system according to the invention may include an implementation of steps of the methods described above in dedicated hardware (e.g., ASIC), configurable hardware (e.g., FPGA), programmable components (e.g., a DSP or general purpose processor with appropriate software), or any combination thereof. The same component(s) may also include other functions. The present invention also pertains to a computer program product comprising code means implementing the steps of the methods described above, which product may be provided on a computer-readable medium such as an optical, magnetic, or solid-state carrier.

The present invention also pertains to a vehicle comprising the system described above.

Embodiments of the present invention may be used advantageously in a wide variety of applications, including without limitation automotive applications, industrial applications, gaming applications, and the like, and this both indoor and outdoor, at short or long range. In some applications, different sensors according to embodiments of the present invention may be combined (e.g., daisy-chained) to produce panoramic coverage, preferably over a full circle (360° field of view).

It should be noted that the method, the pixel, and the pixel array according to the present invention may also be used in triangulation-based systems such as the system of WO 2015/004213 A1, and in existing LIDAR systems, to improve the quality of the measurements in the presence of ambient light.

While the invention has been described hereinabove with reference to separate embodiments, this was done for clarifying purposes only. The skilled person will appreciate that features described in connection with one embodiment, can also be applied to other embodiments, with the same technical effects and advantages. Furthermore, the scope of the invention is not limited to these embodiments, but is defined by the accompanying claims.

The invention claimed is:

1. A system for determining a distance to an object by range gating, the system comprising:
   a solid-state light source arranged for projecting a pattern of spots, preferably discrete spots, of light towards the object in a sequence of pulses, preferably a periodically repeated sequence of pulses;
   a detector comprising an imaging array, the detector being configured for detecting light representing the pattern of spots as reflected by the object in synchronization with said sequence of pulses; and
   processing means configured to calculate the distance to the object as a function of exposure values generated by said pixels in response to said detected light;
   wherein said imaging array comprises a plurality of pixels, each of said pixels comprising:
      a first charge storage well and a second charge storage well for accumulating electrical charges representative of amounts of light reflected by said object and impinging on said pixel during respective sets of exposure intervals, and a third charge storage well;
      wherein said first charge storage well has a charge capacity that is at least 50% greater than a charge capacity of said second charge storage well; and
      wherein said third charge storage well has a smaller charge storage capacity than said first charge storage well and said second charge storage well;
   wherein the pixels of the imaging array are configured to generate said exposure values by accumulating, for all pulses of said sequence, a first amount of electrical charge representative of a first amount of light reflected by said object during a first predetermined time window and a second electrical charge representative of a second amount of light reflected by said object during a second predetermined time window, said second predetermined time window occurring after said first predetermined time window, whereby said solid-state light source is in its "ON" state during the first time window and in its "OFF" state during the second time window; and
   wherein the detecting of the first amount of light and the detecting of said second amount of light occurs at said first charge storage well and at said second charge storage well, respectively.

2. The system according to claim 1, further configured to perform the projecting and the detecting for at least two consecutive sequences of pulses, each of the sequences being operated with a different duration of the first predetermined time window and the second predetermined time window.

3. The system according to claim 1, wherein the imaging array is further adapted to perform 2D video image acquisition.

4. The system according to claim 1, wherein said pixels further comprise circuitry a Rowing said pixel to switch between:
   a charging mode, in which light impinging on said pixel causes said first charge storage well or said second charge storage well to increase a stored amount of charge, and
   a discharging mode, in which light impinging on said pixel causes said first charge storage well or said second charge storage well to decrease a stored amount of charge.

5. The system according to claim 1, wherein said pixels further comprise circuitry allowing photocharges that are generated when an active one of said first charge storage well and said second charge storage well is filled to capacity, to be to deviated to a charge sink without entering a storage well of an adjacent pixel.

6. The system according to claim 1, wherein said pixels further comprise a fourth charge storage well.

7. The system according to claim 2, further configured to perform the projecting and the detecting for at least two consecutive sequences of pulses, each of the sequences being operated with a different duration of the first predetermined time window and the second predetermined time window.

8. The system according to claim 2, wherein the imaging array is further adapted to perform 2D video image acquisition.

9. The system according to claim 2, wherein said pixels further comprise circuitry allowing said pixel to switch between:
   a charging mode, in which light impinging on said pixel causes said first charge storage well or said second charge storage well to increase a stored amount of charge, and
   a discharging mode, in which light impinging on said pixel causes said first charge storage well or said second charge storage well to decrease a stored amount of charge.

10. The system according to claim 2, wherein said pixels further comprise circuitry allowing photocharges that are generated when an active one of said first charge storage well and said second charge storage well is filled to capacity, to be to deviated to a charge sink without entering a storage well of an adjacent pixel.

11. The system according to claim 2, wherein said pixels further comprise a fourth charge storage well.

12. The system according to claim 3, further configured to perform the projecting and the detecting for at least two consecutive sequences of pulses, each of the sequences being operated with a different duration of the first predetermined time window and the second predetermined time window.

13. The system according to claim 3, wherein the imaging array is further adapted to perform 2D video image acquisition.

14. The system according to claim 3, wherein said pixels further comprise circuitry allowing said pixel to switch between:
   a charging mode, in which light impinging on said pixel causes said first charge storage well or said second charge storage well to increase a stored amount of charge, and
   a discharging mode, in which light impinging on said pixel causes said first charge storage well or said second charge storage well to decrease a stored amount of charge.

15. The system according to claim 3, wherein said pixels further comprise circuitry allowing photocharges that are generated when an active one of said first charge storage well and said second charge storage well is filled to capacity, to be to deviated to a charge sink without entering a storage well of an adjacent pixel.

16. The system according to claim 3, wherein said pixels further comprise a fourth charge storage well.

\* \* \* \* \*